United States Patent
Henzen

(10) Patent No.: US 9,201,282 B2
(45) Date of Patent: Dec. 1, 2015

(54) ELECTROPHORETIC DISPLAY DEVICE

(75) Inventor: Alexander Victor Henzen, Bladel (NL)

(73) Assignee: HJ FOREVER PATENTS B.V., Rotterdam (NL)

( * ) Notice: Subject to any disclaimer, the term of this patent is extended or adjusted under 35 U.S.C. 154(b) by 503 days.

(21) Appl. No.: 13/387,660

(22) PCT Filed: Jul. 20, 2010

(86) PCT No.: PCT/EP2010/060482
§ 371 (c)(1),
(2), (4) Date: Apr. 13, 2012

(87) PCT Pub. No.: WO2011/012499
PCT Pub. Date: Feb. 3, 2011

(65) Prior Publication Data
US 2012/0188152 A1    Jul. 26, 2012

(30) Foreign Application Priority Data
Jul. 27, 2009    (EP) .................................... 09166427

(51) Int. Cl.
*G09G 3/34* (2006.01)
*G02F 1/167* (2006.01)
*G02F 1/1343* (2006.01)

(52) U.S. Cl.
CPC ................ *G02F 1/167* (2013.01); *G09G 3/344* (2013.01); *G02F 1/134363* (2013.01); *G02F 2001/1678* (2013.01)

(58) Field of Classification Search
CPC ... G09G 3/344; G09G 3/3688; G09G 3/2022; G02F 1/167; G02F 1/133377; G02F 1/133512; G02F 1/13463; G02F 2001/1678; G02B 26/0841
USPC ................ 345/55, 84, 105, 107; 349/86, 111; 359/296
See application file for complete search history.

(56) References Cited

U.S. PATENT DOCUMENTS 5,745,094 A * 4/1998 Gordon et al. ................ 345/107
6,144,361 A * 11/2000 Gordon et al. ................ 345/107
(Continued)

FOREIGN PATENT DOCUMENTS

| WO | 2006/067650 | 6/2006 |
| WO | 2006/079959 | 8/2006 |

(Continued)

OTHER PUBLICATIONS

International Search Report for PCT/EP2010/060482, mailed Oct. 4, 2010.
(Continued)

*Primary Examiner* — Joe H Cheng
(74) *Attorney, Agent, or Firm* — Nixon & Vanderhye P.C.

(57) ABSTRACT

The invention relates to an electrophoretic display device, to a driver circuit for use in the electrophoretic display device and to chargeable or charged pigment particles for use in the electrophoretic display device. The electrophoretic display device comprises a pixel comprising charged pigment particles for determining a pigmentation of the pixel. The pixel comprises an aperture area being a visible part of the pixel determining the pigmentation of the pixel. The pixel further comprises a storage area for storing the charged pigment particles away from the aperture area. The pixel comprises an accumulation electrode arranged at the storage area for accumulating the charged pigment particles away from the aperture area, and comprises a field electrode occupying a field-electrode area being at least a part of the aperture area of the pixel. The charged pigment particles are movable between the accumulation electrode and the field electrode under control of an electric field. A dimension of the charged pigment particles is selected sufficiently small to obtain a uniform distribution of charged pigment particles across the field-electrode area.

13 Claims, 10 Drawing Sheets

(56) References Cited

U.S. PATENT DOCUMENTS

| | | | |
|---|---|---|---|
| 6,621,541 B1* | 9/2003 | Choi | 349/113 |
| 6,738,039 B2* | 5/2004 | Goden | 345/107 |
| 6,987,502 B1* | 1/2006 | Kishi et al. | 345/107 |
| 7,697,194 B2* | 4/2010 | Van Delden | 359/296 |
| 7,956,820 B2* | 6/2011 | Huitema et al. | 345/3.1 |
| 8,629,833 B1* | 1/2014 | Campisi et al. | 345/107 |
| 2002/0145792 A1* | 10/2002 | Jacobson et al. | 359/296 |
| 2003/0117016 A1* | 6/2003 | Ukigaya | 305/107 |
| 2004/0125433 A1* | 7/2004 | Matsuda et al. | 359/296 |
| 2004/0145696 A1* | 7/2004 | Oue et al. | 349/167 |
| 2004/0239613 A1 | 12/2004 | Kishi | |
| 2005/0104843 A1* | 5/2005 | Schlangen | 345/107 |
| 2005/0219272 A1* | 10/2005 | Johnson et al. | 345/690 |
| 2005/0275933 A1 | 12/2005 | Johnson et al. | |
| 2006/0227196 A1 | 10/2006 | Zhou et al. | |
| 2007/0120814 A1 | 5/2007 | Moriyama et al. | |
| 2008/0291526 A1* | 11/2008 | Lin et al. | 359/296 |
| 2009/0141338 A1* | 6/2009 | Chopra et al. | 359/296 |
| 2009/0322670 A1* | 12/2009 | Bhowmik et al. | 345/107 |

FOREIGN PATENT DOCUMENTS

| | | |
|---|---|---|
| WO | 2006/103604 | 10/2006 |
| WO | 2007/004120 | 1/2007 |
| WO | WO 2008/020355 | 2/2008 |
| WO | 2008/026144 | 3/2008 |

OTHER PUBLICATIONS

Written Opinion of the International Searching Authority for PCT/EP2010/060482 mailed Oct. 4, 2010.

* cited by examiner

ELECTROPHORETIC DISPLAY DEVICE

This application is the U.S. national phase of International Application No. PCT/EP2010/060482, filed 20 Jul. 2010, which designated the U.S. and claims priority to EP Application No. 09166427.6, filed 27 Jul. 2009, the entire contents of each of which are hereby incorporated by reference.

FIELD OF THE INVENTION

The invention relates to an electrophoretic display device.
The invention further relates to a driver circuit for use in the electrophoretic display device and to chargeable pigment particles for use in the electrophoretic display device.

BACKGROUND OF THE INVENTION

Electrophoretic display devices are a relatively new technique of pixilated display devices in which charged pigment particles are moved to generate a required pigmentation of a pixel. Examples of electrophoretic display devices may be found in the international patent application US2006/0227196. This patent application discloses a display device which comprises two substrates. One of the substrates is transparent and is provided with a single electrode which is referred to as the counter electrode. This counter electrode is in other literature also referred to as common electrode or backplane electrode. The other substrate is provided with picture electrodes which comprise row and column electrodes. A display element or pixel is associated with an intersection of a row electrode and a column electrode. Electrophoretic ink is provided between the pixel electrode and the common electrode. The electrophoretic ink comprises multiple microcapsules of about 10 to 50 microns. Each microcapsule comprises positively charged white particles and negative charge black particles suspended in a fluid. When a positive voltage is applied to the pixel electrode with respect to the common electrode, the positively charged white particles move to the side of the micro capsule directed to the transparent substrate on which the common electrode is present and a viewer will see a white display element. Simultaneously, the black particles move to the pixel electrode at the opposite side of the microcapsule where they are hidden to the viewer. By applying a negative voltage to the pixel electrode with respect to the common electrode, the black particles move to the common electrode at the side of the micro capsule directed to the transparent substrate and the display element appears dark to a viewer. When the voltage is removed, the display device remains in the acquired state and thus exhibits a bi-stable character. The electrophoretic ink display with its black and white particles is particularly useful as an electronic book. Grey scales may be created in the display device by controlling the amount of particles that move to the common electrode at the top of the microcapsules.

A known type of electrophoretic display devices comprise in-plane switching of the charged particles. Such an electrophoretic display device is, for example, known from US 2005275933. In this patent application a display panel is disclosed in which electrophoretic material is sandwiched between a first and a second substrate. A pixel of said display further comprises a first and second electrode for locally controlling the material of said electrophoretic layer. The first and second electrodes are positioned on essentially the same distance from the first substrate so that an essentially lateral field is generated in said electrophoretic layer which is used to move the particles in and out of the light path of the pixel of the display, as such defining the transmission of the pixel.

A benefit of the in-plane switching of charged particles is that the electrophoretic display device may comprise a transparent state, allowing a choice of reflector or possibly backlight. However, it is relatively difficult to control the electrical field and particle motion distribution accurately enough to provide a homogenous pixel absorbance in the "dark" state.

SUMMARY OF THE INVENTION

It is an object of the invention to provide an electrophoretic display which may be operated in a more controlled manner.

A first aspect of the invention relates to an electrophoretic display device according to claim 1. A second aspect of the invention relates to a driver circuit for use in an electrophoretic display device according to claim 14. A third aspect of the invention relates chargeable or charged pigment particles for use in an electrophoretic display device according to claim 15.

According to the first aspect of the invention, the object is achieved by an electrophoretic display which comprises a pixel comprising charged pigment particles for determining a pigmentation of the pixel. The pixel comprises an aperture area being a visible part of the pixel determining the pigmentation of the pixel. The pixel further comprises a storage area for storing the charged pigment particles away from the aperture area. The pixel comprises an accumulation electrode and a field electrode, the accumulation electrode being arranged at the storage area for accumulating the charged pigment particles away from the aperture area, and the field electrode occupying a field-electrode area being at least a part of the aperture area of the pixel. The charged pigment particles are movable between the accumulation electrode and the field electrode under control of an electric field. A dimension of the charged pigment particles is selected sufficiently small to obtain a uniform distribution of charged pigment particles across the field-electrode area for generating a homogeneous pigmentation at the part of the aperture of the pixel occupied by the field electrode.

An aperture area is an area through which the pixel is typically viewed by a user of the electrophoretic display device. In an electrophoretic display device which uses ambient light for illuminating the pixels, the aperture area is the area in which the received ambient light enters the pixel of the electrophoretic display device and through which the reflected light is subsequently emitted again. This reflected light is partially converted, filtered and/or blocked by the charged pigment particles. This partial conversion, filtering and/or blocking of light is perceived as a pigmentation of the pixel. Alternatively, when the electrophoretic display device comprises a backlighting system, light emitted by the backlighting system is transmitted by the pixel and emitted via the aperture area. The presence or absence of the charged pigment particles at the field-electrode area determines a transmission of the pixel for light emitted by the backlighting system, thus determines the intensity and/or color of the light transmitted by the pixel.

The charged pigment particles may be used to block light and thus substantially only determine a light intensity which is reflected (when using ambient light) and/or which is transmitted (when using the backlighting system) by the pixel. Alternatively, the charged pigment particles may absorb a part or all of the light transmitted through the pixel and as such alter the color of the light transmitted through the pixel. Even further alternatively, the charged pigment particles may comprise luminescent particles which may absorb part of the light impinging on the pixel and may convert part of the absorbed light into light of a different color.

Without wishing to be held to any particular theory, the inventors have found that the charged pigment particles behave in a different manner when the size of the charged pigment particles is reduced. Typically, when charged particles are collected on a charged electrode, the repellent force between the charged particles cause the charged particles to each find a position on the charged electrode in which the distance between individual particles is as large as possible. In practice, this means that normally (as in prior art) the charged particles all are arranged at an edge of the electrode, typically forming a rim on or around the electrode edges. The inventors have found that by reducing the dimensions of the charged pigment particles according to the invention, the distribution of the charged pigment particles on a charged electrode is different. When the dimensions of the charged pigment particles are below a certain threshold, the charged pigment particles distribute substantially homogeneously across the whole surface of the charged electrode.

This effect is beneficially used by the inventors to generate a pixel for an electrophoretic display device in which the pigmentation may be adapted by determining the amount of charged pigment particles which are transferred from the accumulation electrode to the field electrode. The pixel comprises a field electrode which is configured for covering at least a part of the aperture area of the pixel. The pixel further comprises an accumulation electrode which is arranged at a storage area which is an area in which the charged pigment particles are stored when not used to alter the pigmentation of the pixel. The charged pigment particles of the pixel are moveable between the accumulation electrode and the field electrode under control of an electric field which may, for example, be applied by the driver circuit. As soon as the charged pigment particles arrive at the field electrode, the dimension of the charged pigment particles allow them to behave differently than expected and they start to cover the whole field-electrode area homogeneously with charged pigment particles, rather than to only cover the field-electrode edges. Due to this homogeneous distribution of the charged pigment particles, the field-electrode area always comprises a homogeneous pigmentation in which the intensity of the pigmentation is depending on the amount of charged pigment particles which are collected at the field electrode.

This effect is especially beneficial when used in in-plane electrophoretic display devices. The electric field between the two electrodes in known in-plane electrophoretic display devices is typically not homogeneous. As such, it is relatively difficult to obtain a uniform distribution of the charged pigment particles when using the known charged pigment particles between the two electrodes in the known in-plane electrophoretic display devices to generate a substantially homogeneous pigmentation. In an electrophoretic display device according to the invention the charged pigment particles are selected sufficiently small to obtain a uniform distribution of charged pigment particles across the field electrode. In a preferred embodiment of the electrophoretic display device according to the invention, the accumulation electrode and the field electrode are arranged in an in-plane configuration. The specifically selected dimensions of the charged pigment particles cause the distribution of charged pigment particles across the field electrode to always be uniform, making it relatively easy to generate a uniform pigmentation in the in-plane electrophoretic display device according to the invention. The in-plane configuration of the accumulation electrode and the field electrode is obtained when an imaginary plane may be drawn parallel to the field electrode and in which the imaginary plane coincides both with at least a part of the accumulation electrode and with at least a part of the field electrode. This may, for example, be achieved when the accumulation electrode and the field electrode are deposited on a same surface, for example, on a same substrate.

In the known electrophoretic display device, an essentially lateral field is generated between the electrodes which are used to move the particles in and out of the light path of the pixel of the display, as such defining the transmission of the pixel. As such, the transmission of the pixel in the known in-plane electrophoretic display device is determined by moving pigment particles, while in the electrophoretic display device according to the invention, the pigmentation of the pixel occurs homogenously ON the pixel electrode, instead of BETWEEN the pixel- and accumulation electrodes. Such a static definition of the pigmentation of the pixel according to the invention allows a more controlled way of defining the pigmentation of the pixel and allows a reduction of the energy to drive the electrophoretic display device compared to the known electrophoretic display device.

The inventors believe that the effect of the homogeneous distribution of the charged pigment particles is dependent on the dimensions of the charged pigment particles in combination with the electrical charge of the field electrode collecting the charged pigment particles, and/or in combination with the electrical charge of the charged pigment particles. As such, the dimensions at which the charged pigment particles start to form a substantially uniformly distribution across the field-electrode area may vary, dependent on these chosen parameters.

A further benefit of the electrophoretic display device according to the invention is that the charged pigment particles do not accumulate in high field areas. As soon as the charged pigment particles arrive at the field electrode, or the accumulation electrode, the charged pigment particles generate a substantially homogeneous distribution of charged pigment particles across the whole field-electrode area providing, for example, a homogeneous absorption under all circumstances across the whole field-electrode area. As such, the level of the absorption may relatively easily be determined by determining the amount of charged pigment particles which are transported from the accumulation electrode to the field electrode. The substantially automatic homogeneous distribution of the charged pigment particles across the whole area of the field-electrode area due to the reduced size of the charged pigment particles ensures that always a homogeneous absorption occurs across the whole of the field-electrode area and that the density of the charged pigment particles is substantially homogeneous across the field-electrode area.

Document WO2007/004120 discloses an electrophoretic display device in which cross-talk between adjacent pixels is reduced. Although the FIGS. 1a and 1b of the cited document seem to disclose a uniform distribution of the pigment particles, document WO2007/004120 nowhere discloses how this uniform distribution is achieved. No where in WO2007/004120 is disclosed that the dimensions of the charged pigment particles have to be selected sufficiently small to obtain the uniform distribution of the charged pigment particles according to the current invention. As such, the disclosure of WO2007/004120 is non-enabling with respect to the current effect being the uniform distribution obtained by selecting sufficiently small charged pigment particles as is claimed in the electrophoretic display device according to the current invention. Experiments have shown that the typical behavior of charged particles collected on a charged electrode is to maximize the distance between individual particles. In practice this means that normally the charged particles all are arranged at an edge of the charged electrode, typically forming a rim around the electrode edges. The inventors have found that when reducing the dimensions of the charged pigment particles, the behavior of the charged pigment particles change such that pigment particles at or below a predefined dimension distribute uniformly across the charged electrode.

In an embodiment of the electrophoretic display device, the charged pigment particles comprise nano-particles having a particle size below 500 nanometers and/or below 400 nanometers. The charged pigment particles do not necessarily have to have a symmetrical shape or a smooth shape. Furthermore, in the electrophoretic display device according to the current embodiment a major part of the charged pigment particles comprise a particle size below 500 nanometers and/or below 400 nanometers. The major part may, for example, relate to at least half of the charged pigment particles present in a pixel which correspond to the above stated particle size definition. Still, over time, particles may, for example, clot to form some larger charged pigment particles. In a preferred embodiment the particle size is below 400 nanometers which is below the wavelength of the visible light. A benefit of having charged pigment particles having a particle size below 400 nanometers is that possible scattering of visible light by the charged pigment particles is reduced or eliminated. As human visibility stops at 380 nanometers, using charged pigment particles having a dimension less than 400 nanometers prevent possible scattering of substantially all of the light in the visible range of the spectrum of the human eye.

In an embodiment of the electrophoretic display device, the electrophoretic display device comprises a driver circuit for driving the pixel and for determining a pigmentation of the pixel, the driver circuit being configured for temporarily varying a static charge difference between the field electrode and the accumulation electrode for determining an amount of charged pigment particles to move from the accumulation electrode to the field electrode and/or from the field electrode to the accumulation electrode. The static charge difference between the field electrode and the accumulation electrode is required to capture the charged pigment particles at either the field electrode or the accumulation electrode and to prevent them from freely flowing through the carrier-fluid typically present inside the pixel. By temporarily varying this static charge difference, for example, by applying a square wave to the static charge signal between the field electrode and the accumulation electrode, the amount of charged pigment particles which are at the field electrode may be controlled. Because the dimensions of the charge pigment particles is selected sufficiently small to obtain a substantially homogeneously distribute of charge pigment particles across the field-electrode area, the amount of charged pigment particles determines the pigmentation of the pixel.

In an embodiment of the electrophoretic display device, the electrophoretic display device comprises a plurality of pixels, each comprising the aperture area comprising the field electrode, and each comprising the storage area comprising the accumulation electrode, the accumulation electrodes of the plurality of pixels being coupled to form a common accumulation electrode for the plurality of pixels, the common accumulation electrode omitting a need for a barrier between the plurality of pixels. In known electrophoretic display devices barriers or structures are required to localize the charged pigment particles to prevent them from migrating to an inactive part of the panel. Such migrated charged pigment particles of the known electrophoretic display devices do not contribute to the pigmentation of the pixels and reduce the contrast of the known electrophoretic display devices. In the electrophoretic display device according to the invention no barriers are required. Due to the dimensions of the charged pigment particles according to the invention which are selected sufficiently small, the charged pigment particles are captured by the electrical field present and do not wander around through the pixels. Furthermore, due to the nature of the selected charged pigment particles, the charged pigment particles always generate a homogeneous distribution at a charged electrode. This charged electrode may be the field electrode or the accumulation electrode. When coupling the accumulation electrodes of a plurality of pixels to form a common accumulation electrode, all charged pigment particles which are present on the common accumulation electrode form a substantial homogeneous distribution across the common accumulation electrode—thus ensuring that there are always sufficient charged pigment particles near the field electrode of any of the plurality of pixels to provide sufficient contrast. The charged pigment particles may be both accumulated at the common accumulation electrode and may be distributed across the common accumulation electrode. As such, no additional barriers or structures are required to prevent the charged pigment particles from migrating through the plurality of pixels of the electrophoretic display.

In an embodiment of the electrophoretic display device, the field-electrode area is larger than half the aperture area. As such a major part of the pigmentation of the pixel may be actively adapted via adapting the amount of charged pigment particles which are transferred from the accumulation electrode to the field electrode.

In an embodiment of the electrophoretic display device, the field-electrode area is substantially equal to the aperture area. In such an embodiment, the pigmentation of the whole aperture area may be determined via the migration of charged pigment particles from the accumulation electrode to the field electrode, and vice versa. As such, the pigmentation of the whole pixel as perceived by a viewer may be adapted continuously. The amount of charged pigment particles may, for example, be controlled by controlling a width of a square-wave of charge difference between the accumulation electrode and the field electrode, generated by the driver circuit.

In an embodiment of the electrophoretic display device, the field electrode is at least partially transparent to visible light. A benefit of this embodiment is that the electrophoretic display device may be used in transmission, for example, when using a backlighting system to illuminate the pixels. Alternatively, the use of an at least partially transparent field electrode enables the use of a stack of pixels in which the light is transmitted through the stack to determine a color of the light transmitted through the stack. A pixilated display device typically comprises a two-dimensional array of pixels arranged in a plane constituting the display. Each pixel in this two-dimensional array of pixels may be used to determine a contribution of one of the primary colors for generating a color display device. When using a field electrode which is at least partially transparent to visible light, the electrophoretic display device may be constituted of a three-dimensional array of pixels in which the pixels may also be stacked in a direction substantially perpendicular to the plane constituting the display. Each image pixel may be constituted of a plurality of stacked electrophoretic pixels each comprising a field electrode, an accumulation electrode and movable charged pigment particles. The light emitted by the image pixel has to be transmitted by all of the electrophoretic pixels before being re-emitted. In such a configuration, the color of a single pixel may be determined by the absorption or conversion of the charged pigment particles of the different electrophoretic pixels of the stack of electrophoretic pixels constituting the image pixel. A major benefit compared to the known pixilated display devices is that the dimensions of the individual pixels may be increased while maintaining the lateral image pixel resolution or the lateral image pixel resolution of the pixilated display device may be increased. In known pixilated display devices, such as known liquid crystal display devices, the image pixel comprises a plurality of liquid crystal pixels arranged in a two-dimensional array which increases the lateral dimension of the image pixel in the known pixilated display device. Due to the three-dimensional stack of electrophoretic pixels, the spatial resolution of a color pixel may be the same compared to the spatial resolution of a black-and-white pixel, thus improving the resolution of the pixilated electrophoretic display device.

In an embodiment of the electrophoretic display device, the field electrode is at least partially reflective to visible light. A benefit of this embodiment is that the electrophoretic display device may use ambient light entered via the aperture area and re-emitted by the aperture area after reflection from the field electrode while parallax effect in the electrophoretic display device is reduced. Often, in the known electrophoretic display devices, an additional reflective layer is applied to the back of the substrate on which the electrodes are arranged to ensure the reflection of the ambient light. The thickness of the substrate represents an additional distance between the field electrode and the reflective layer which may cause parallax distortions in the image produced on the known electrophoretic display devices. By having the second field electrode a reflective electrode to reflect the ambient light to be re-emitted from the pixel, no distance is present between the field electrode and the reflective layer and as such the parallax distortion is significantly reduced. The electrophoretic display device may be constituted of the three-dimensional stack of electrophoretic pixels in which, for example, a first type of the electrophoretic pixels comprises a light reflective field electrode and a second type of the electrophoretic pixels comprises a light transmissive field electrode. The second type of electrophoretic pixels typically is arranged between the first type of electrophoretic pixels and an entrance window for allowing ambient light to enter the electrophoretic display device.

A further benefit of the field electrode being at least partially reflective to visible light is that fewer components are required as no additional light-reflection layer may be required.

In an embodiment of the electrophoretic display device, the accumulation electrode of the pixel comprises a first accumulation electrode and a second accumulation electrode, and wherein the charged pigment particles comprise a first type of charged pigment particles and a second type of charged pigment particles, the first type of charged pigment particles being oppositely charged with respect to the second type of charged pigment particles, and, in operation, the first accumulation electrode being oppositely charged with respect to the second accumulation electrode. In such an arrangement, two different charged pigment particles may be used in a single pixel of the electrophoretic display. The first type of charged pigment particles may, for example, convert the impinging light to a different color compared to the second type of charged pigment particles. As such, the applied signal by the driver circuit determines which of the first type of charged pigment particles and/or of the second type of charged pigment particles are located on the field electrode and are homogeneously distribute across the field electrode. As such, the pigmentation perceived by a viewer of the pixel may be either based on the pigmentation of the first type of charged pigment particles, or based on the pigmentation of the second type of charged pigment particles, or based on a mixture of the pigmentation of the first type and second type of charged pigment particles. By adapting the signal generated by the driver circuit, a specific amount of the first type of charged pigment particles may be transferred from the first accumulation electrode toward the field electrode to determine the contribution to the pigmentation by the first type of charged pigment particles. By further adapting the signal generated by the driver circuit, a further specific amount of the second type of charged pigment particles may be transferred from the second accumulation electrode towards the field electrode, possibly to mix with the already present first type of charged pigment particles to form a predetermined pigmentation of the pixel being a mixture of the pigmentation of the first type of charged pigment particles and the second type of charged pigment particles.

In an embodiment of the electrophoretic display device, the pixel comprises a first sub-pixel and a second sub-pixel adjacent to the first sub-pixel and stacked in a direction substantially perpendicular to the aperture area. In this embodiment, the electrophoretic display device constitutes a three-dimensional stack of pixels. As indicated before, such a three-dimensional stack of pixels may be beneficial when wanting to improve the resolution of the electrophoretic display device. In the known display devices, each image pixel is constituted of a plurality of pixels, for example, each of the plurality of pixels providing a color contribution to the image pixel. In such a known display device, the image pixel, for example, is constituted of three sub-pixels contributing red, blue and green to the image pixel. These three sub-pixels are in the known configuration typically arranged in a two-dimensional array of sub-pixels constituting the display device. Due to this two-dimensional array, the image pixel has a lateral dimension of three sub-pixels. In the electrophoretic display device according to the current embodiment the sub-pixels may be stacked in a three-dimensional array of sub-pixels, allowing the sub-pixels constituting a single image pixel to be stacked perpendicular to the aperture area through which the sub-pixels are visible by the viewer. As such, the lateral dimensions of the image pixel may be reduced by a factor of three, allowing the resolution of the electrophoretic display device according to the current embodiment to be significantly increased.

In an embodiment of the electrophoretic display device, the first sub-pixel comprises a first field-electrode area and wherein the second sub-pixel comprises a second field-electrode area, the first field-electrode area at least partially overlaps the second field-electrode area.

In an embodiment of the electrophoretic display device, the first sub-pixel comprising a first field electrode and the second sub-pixel comprising a second field electrode, wherein the first field electrode is at least partially transparent to visible light and wherein the second field electrode is at least partially reflective to visible light. The second field electrode may thus be used to reflect any ambient light which enters via the aperture area of the first sub-pixel. Such an electrophoretic display device may beneficially be illuminated via ambient light. The ambient light entering via the aperture area of the first sub-pixel is at least partially transmitted by the first field electrode of the first sub-pixel and is at least partially transmitted by the second sub-pixel. When the ambient light reaches the second field electrode, the ambient light will at least partially be reflected by the second field electrode after which the reflected light will be partially transmitted by the remainder of the second sub-pixel and by the first sub-pixel after which part of the reflected ambient light is re-emitted by the electrophoretic display device. While progressing through the first sub-pixel and partially through the second sub-pixel, the first type of charged pigment particles and the second type of charged pigment particles may influence the intensity and/or color of the light progressing through the first sub-pixel and the second sub-pixel and as such determine the pigmentation perceived by a viewer of the pixel.

In an embodiment of the electrophoretic display device, the pixel comprises a third sub-pixel arranged between the first sub-pixel and the second sub-pixel, the third sub-pixel comprising a third field electrode being at least partially transparent to visible light. Having three sub-pixels enables the pixel to have three different charged pigment particles which may be used to change the intensity and/or color of the pixel. As such, a three-dimensional stack of sub-pixels may be generated in which each pixel may use three different charged pigment particles, for example, each having a different color.

In an embodiment of the electrophoretic display device, the electrophoretic display device comprises a backlighting system for illuminating the pixel, the charged pigment particles in the pixel being configured for altering a transmission of light emitted by the backlighting system while progressing through the pixel towards the aperture area. The altering of the transmission comprises a reduction of the transmission, the absorption of a part of the transmitted light and comprises the conversion of part of the transmitted light into light of a different wavelength, for example, via charged pigment particles comprising luminescent material.

According to the second aspect of the invention, the object is achieved by a driver circuit for use in an electrophoretic display device. The driver circuit is configured for applying a time-varying electric field between the accumulation electrode and the field electrode of the electrophoretic display device for determining an amount of charged pigment particles being moved between the accumulation electrode and the field electrode. The time-varying electric field may, for example, represent a square-shaped varying electric field in which a width of the square-shaped signal represents a time during which the electric field is altered, and in which a height of the square-shaped signal represents an intensity variation of the electric field for moving the charged particles between the accumulation electrode and the field electrode. So by applying a first predefined time-varying electric field between the accumulation electrode and the field electrode, a predefined amount of charged pigment particles may be moved from the accumulation electrode to the field electrode to increase the pigmentation of the pixel. By applying a second predefined time-varying electric field between the accumulation electrode and the field electrode, a further predefined amount of charged pigment particles may be moved from the field electrode to the accumulation electrode to reduce the pigmentation of the pixel. The first predefined time-varying electric field may, for example, be an inverted field compared to the second predefined time-varying electric field.

According to the third aspect of the invention, the object is achieved with chargeable or charged pigment particles for use in an electrophoretic display device. The chargeable or charged pigment particles, when in use in the electrophoretic display device, are selected to be sufficiently small to obtain a uniform distribution of charged pigment particles across the field-electrode area. As mentioned before, the inventors have found that charged pigment particles may behave in a different manner than expected when the size of the charge pigment particles is reduced. Typically when charge pigment particles are collected on a charged electrode, the repellent force between the charge pigment particles cause the charge pigment particles to each find a position on the charged electrode in which the distance between individual particles is as large as possible. In practice, this means that the charged pigment particles all are arranged at area's of the electrode having the highest electric field, typically the edge of the electrode, typically forming a rim around the electrode edges. The inventors have found that by reducing the dimensions of the charged pigment particles, the distribution of the charged pigment particles on a charged electrode is different. When the dimensions of the charged pigment particles are below a certain threshold, the charged pigment particles distribute homogeneously across the whole surface of the charged electrode. The inventors believe that the effect of the homogeneous distribution of the charged pigment particles is dependent on the dimensions of the charged pigment particles in combination with the electrical charge of the field electrode collecting the charged pigment particles, and/or in combination with the electrical charge of the charged pigment particles. As such, the dimensions at which the charged pigment particles start to form a substantially uniformly distribution across the field-electrode area may vary, dependent on these chosen parameters.

These and other aspects of the invention are apparent from and will be elucidated with reference to the embodiments described hereinafter.

BRIEF DESCRIPTION OF THE DRAWINGS

In the drawings.

The figures are purely diagrammatic and not drawn to scale. Particularly for clarity, some dimensions are exaggerated strongly. Similar components in the figures are denoted by the same reference numerals as much as possible.

DETAILED DESCRIPTION

Figure 1A:
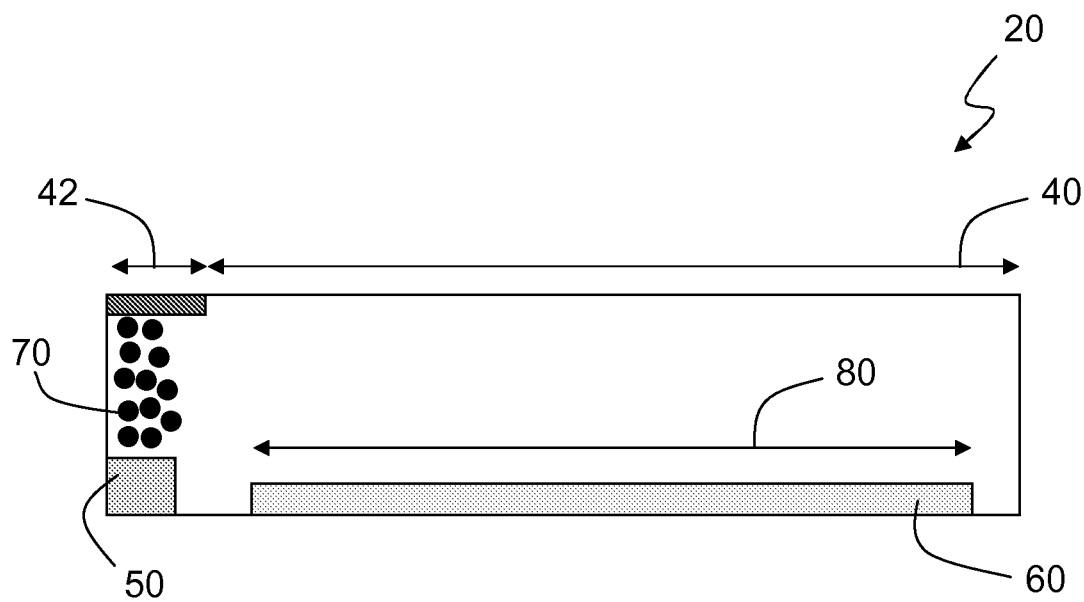
FIGS. 1A and 1B show a schematic cross-sectional view of a first embodiment of a pixel of an electrophoretic display device according to the invention.
Figure 1B:
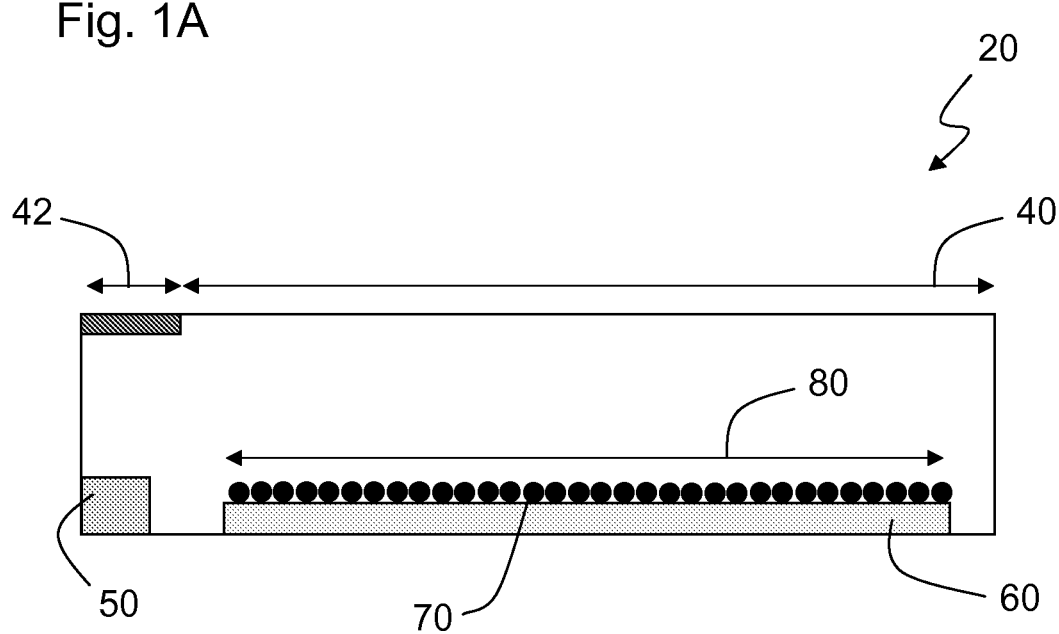

FIGS. 1A and 1B show a schematic cross-sectional view of a first embodiment of a pixel 20 of an electrophoretic display device 10 (see FIG. 2) according to the invention. The pixel 20 comprises charged pigment particles 70 which are configured to move under control of an electric field (not indicated). The pixel 20 comprises an aperture area 40 which is an area of the pixel 20 which is a visible part of the pixel 20. The pigmentation of this aperture area 40 determines the pigmentation as perceived by a viewer watching the electrophoretic display device 10 comprising the pixel 20. The pixel 20 further comprises a storage area 42 which is configured for storing charged pigment particles 70 away from the aperture area 40. In the embodiment shown in FIGS. 1A and 1B the storage area 42 comprises a shield 42 for shielding stored charged pigment particles 70 hidden from view. Such a shield 42 is fully optional. Alternative ways to generate a shielding of the charged pigment particles 70 from view is by using an opaque and substantially non-reflective accumulation electrode 50. However, the shielding 42 from view is not essential to the invention and even without the active shielding of the charged pigment particles 70 from view, the charge pigment particles 70 at the accumulation electrode 50 merely represent a dark rim or edge of the pixel 20. A part of the aperture area 40 comprises a field electrode 60. The field-electrode area 80 of the field electrode 60 is smaller compared to the dimension of the aperture 40. Still the field-electrode area 80 of the field electrode 60 should preferably cover at least half of the aperture 40 to be able to change the pigmentation of the aperture 40 significantly using the charged pigment particles 70. A part of the storage area 42 comprises an accumulation electrode 50. The pixel 20 is configured for generating an electrical field (not indicated) between the accumulation electrode 50 and the field electrode 60 to migrate charged pigment particles 70 from the accumulation electrode 50 to the field electrode 60, or vice versa. If sufficient charged pigment particles 70 have migrated from the accumulation electrode 50 to the field electrode 60, or vice versa, the generated electrical field is switched off to stop the migration of particles and to create a static situation in which the pigmentation of the pixel 20 is determined via the charged pigment particles which have migrated.

The charged pigment particles 70 as used in the current pixel 20 have been selected sufficiently small to obtain a uniform distribution of charged pigment particles 70 across the field-electrode area 80. The inventors have found that the charged pigment particles 70 behave in a different manner than known from the prior art when the dimension of the charged pigment particles 70 is reduced. Typically, when charged particles are collected on a charged electrode, the repellent force between the charged particles cause the charged particles to each find a position on the charged electrode in which the distance between individual particles is as large as possible. In practice, this means that normally (as in prior art) the charged particles all are arranged at an edge of the electrode, typically forming a rim at or around the electrode edges. The inventors have found that by reducing the dimensions of the charged pigment particles 70 according to the invention, the distribution of the charged pigment particles 70 on a charged electrode is different. When the dimensions of the charged pigment particles 70 are below a certain threshold, the charged pigment particles 70 distribute substantially homogeneously across the whole surface of the charged electrode.

This effect is beneficially used by the inventors to generate a pixel 20 for an electrophoretic display device 10 in which the pigmentation may be adapted by determining the amount of charged pigment particles 70 which are transferred from the accumulation electrode 50 to the field electrode 60. As soon as the charged pigment particles 70 arrive at the field electrode 60, the dimension of the charged pigment particles 70 allow them to behave differently than expected such that they start to cover the whole field-electrode area 80 homogeneously with charged pigment particles 70, rather than to only cover the field-electrode edges. Due to this homogeneous distribution of the charged pigment particles 70, the field-electrode area 80 always comprises a homogeneous pigmentation in which the intensity of the pigmentation is depending on the amount of charged pigment particles 70 which are collected at the field electrode 60.

A further benefit of the current invention is that the pigmentation generated may be maintained by maintaining a static charge on the field-electrode 60. Known in-plane electrophoretic display devices have a pair of electrodes arranged on either side of an aperture area. The pigmentation of such a known in-plane electrophoretic display device is generated by generating an electrical field between the pair of electrodes which determines the distribution of charged pigment particles between the pair of electrodes to determine a level of opaqueness determining the pigmentation of the pixel. However, due to the non-uniform electric field between the two electrodes in the known in-plane electrophoretic display device, a good uniformity of the pigmentation is difficult to obtain. In the pixel 20 according to the invention, the dimension of the charged pigment particles 70 is selected sufficiently small to obtain a uniform distribution on a charged electrode. As such, the distribution of the charged pigment particles 70 according to the invention always has a homogeneous distribution due to the nature of the charged pigment particles 70. This causes the electrophoretic display device 10 according to the invention to be easily addressable compared to known in-plane electrophoretic display devices.

FIG. 1A shows a first situation in which the charged pigment particles 70 all are accumulated at the accumulation electrode 50. FIG. 1B shows a second situation in which the charged pigment particles 70 all are homogeneously distributed across the field electrode 60. It will be clear to the person skilled in the art that any intermediate state may be possible and that a time-varying electric field between the accumulation electrode 50 and the field electrode 60 may be applied for determining the amount of charged pigment particles 70 which move between the accumulation electrode 50 and the field electrode 60.

A major part of the charged pigment particles 70 of a pixel have a dimension smaller than 500 nanometers. The major part may, for example, relate to at least half of the charged pigment particles 70 present in the pixel 20. Still, over time, charged pigment particles 70 may, for example, clot to form some larger charged pigment particles. The charged pigment particles 70 do not necessarily have to have a symmetrical shape or a smooth shape. In a preferred embodiment the particle size of the major part of the charged pigment particles 70 is below 400 nanometers which is below the wavelength of the visible light. A benefit of having charged pigment particles 70 having a particle size below 400 nanometers is that possible scattering of visible light by the charged pigment particles 70 is reduced. As human visibility stops at 380 nanometers, using charged pigment particles 70 having a dimension less than 400 nanometers prevent possible scattering of substantially all of the light in the range visible to the human eye.

In the pixel 20 shown in FIGS. 1A and 1B the field electrode 60 may be at least partially reflective to visible light. A benefit of this embodiment is that the electrophoretic display device 10 may use ambient light (not indicated) entered via the aperture area 40 and re-emitted via the aperture area 40 after reflection from the field electrode 60. As such, the electrophoretic display device 10 may be constituted of fewer components as no additional light-reflection layer may be required.

Figure 2:
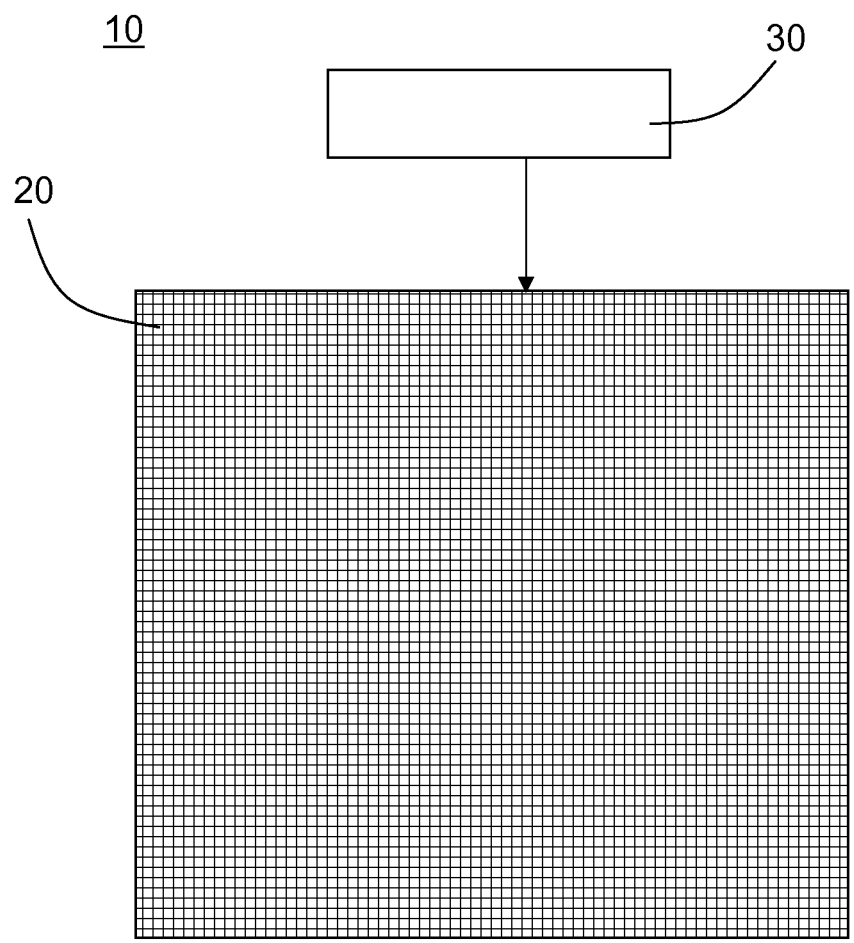
FIG. 2 shows a schematic representation of an electrophoretic display device according to the invention.

FIG. 2 shows a schematic representation of an electrophoretic display device 10 according to the invention. The electrophoretic display device 10 comprises a pixel 20, preferably arranged in a matrix of pixels 20. Furthermore, the electrophoretic display device 10 comprises a drive circuit for applying a time-varying electrical field between the accumulation electrode 50 (see FIGS. 1A and 1B) and the field electrode 60 (see FIGS. 1A and 1B) for determining the amount of charged pigment particles 70 which are being moved between the accumulation electrode 50 and the field electrode 60. To this end, the electrophoretic display device 10 comprises means (not shown) for addressing the pixels 20 in the matrix individually such that the pigmentation of each pixel 20 in the matrix of pixels may be determined to, for example, for an image on the electrophoretic display device 10.

Figure 3A:
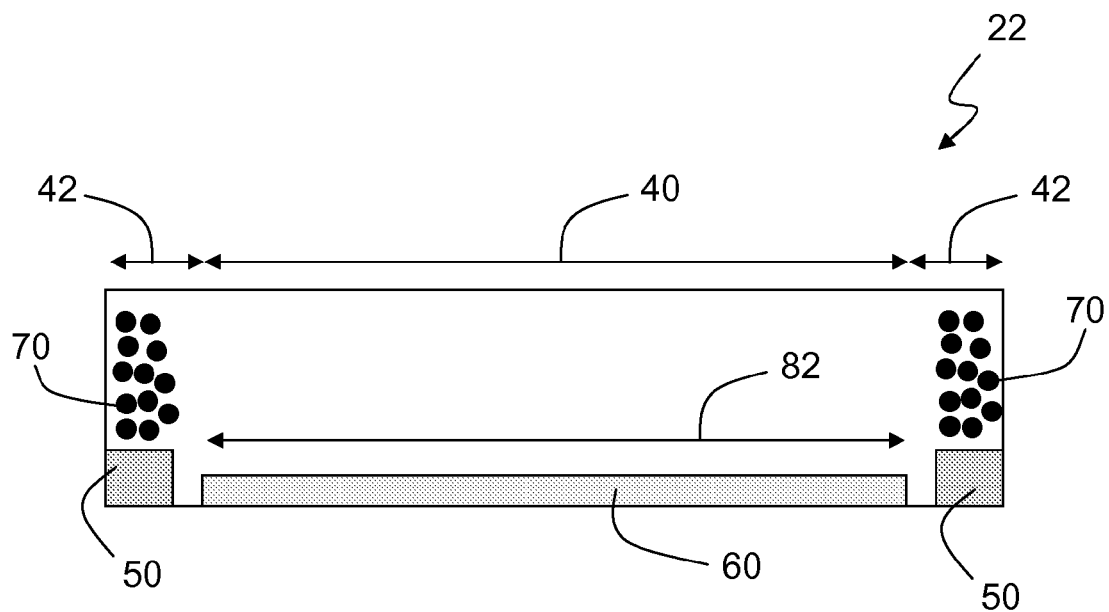
FIGS. 3A and 3B show a schematic cross-sectional view of a second embodiment of a pixel of an electrophoretic display device according to the invention.
Figure 3B:
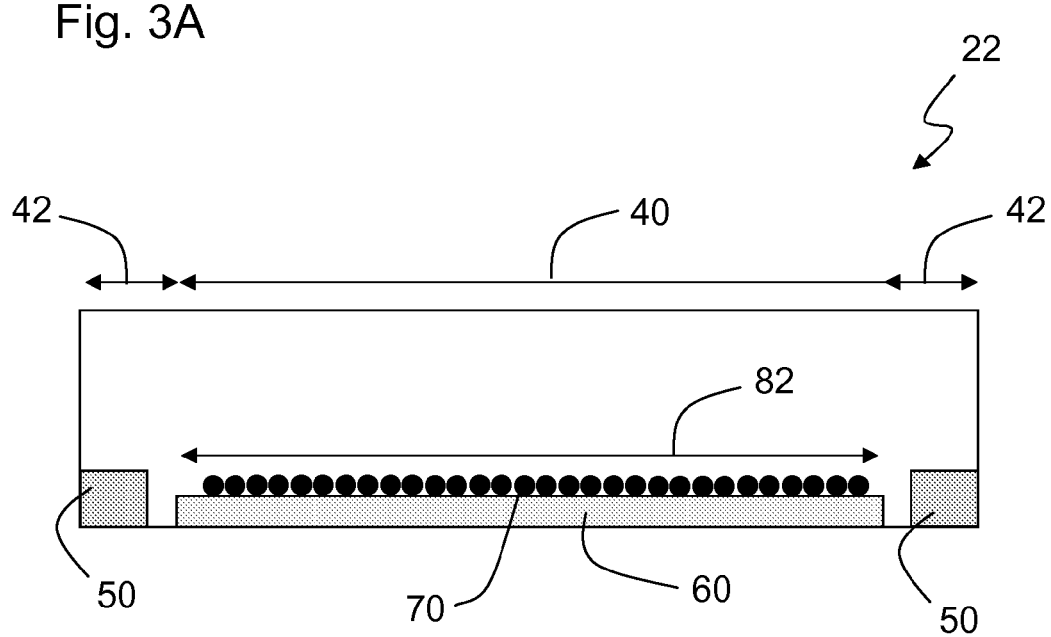

FIGS. 3A and 3B show a schematic cross-sectional view of a second embodiment of a pixel 22 of an electrophoretic display device 10 according to the invention. In this second embodiment, the arrangement of the accumulation electrode 50 is altered in that the pixel 22 comprises two accumulation electrodes 50 arranged on opposite sides of the field electrode 60. Both accumulation electrodes 50 preferably are at the same static charge, for example, are connected to ground. When applying a signal to the field electrode 60, charged pigment particles 70 which are homogeneously distributed over the two accumulation electrodes 50 will migrate to the field electrode 60, thus changing the pigmentation of the pixel 22. In the embodiment shown in FIGS. 3A and 3B the charged pigment particles 70 may migrate from two sides to the field electrode 60, and vice versa, enabling an improved switching speed for altering the pigmentation of the pixel 22. In the embodiment shown in FIGS. 3A and 3B no shield 42 is present. As indicated before, active shielding of the charged pigment particles 70 from view is not essential and thus not required. Still, the accumulation electrode 50 may, for example, be a non-reflective opaque accumulation electrode 50 which still would result in an active shielding of the charged pigment particles 70 from view when located at the accumulation electrode 50.

FIG. 3A shows the first situation in which the charged pigment particles 70 all are accumulated at the two accumulation electrodes 50. FIG. 3B shows the second situation in which the charged pigment particles 70 all are homogeneously distributed across the field electrode 60. It will be clear to the person skilled in the art that any intermediate state may be possible and that a time-varying electric field between the accumulation electrodes 50 and the field electrode 60 may be applied for determining the amount of charged pigment particles 70 which move between the accumulation electrodes 50 and the field electrode 60.

Figure 4A:
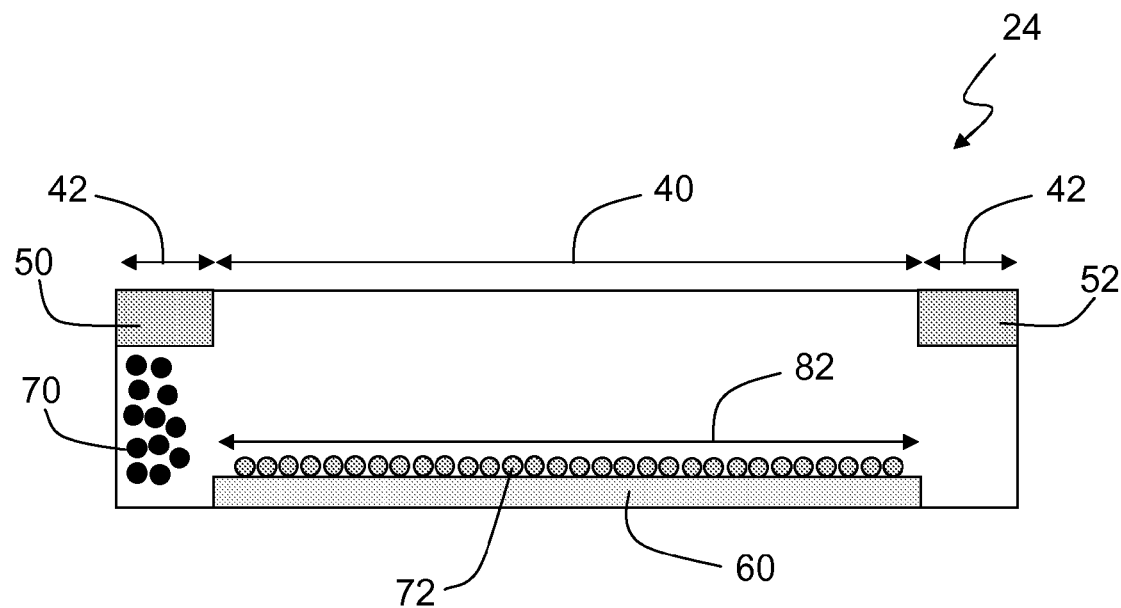
FIGS. 4A and 4B show a schematic cross-sectional view of a third embodiment of a pixel of an electrophoretic display device according to the invention.
Figure 4B:
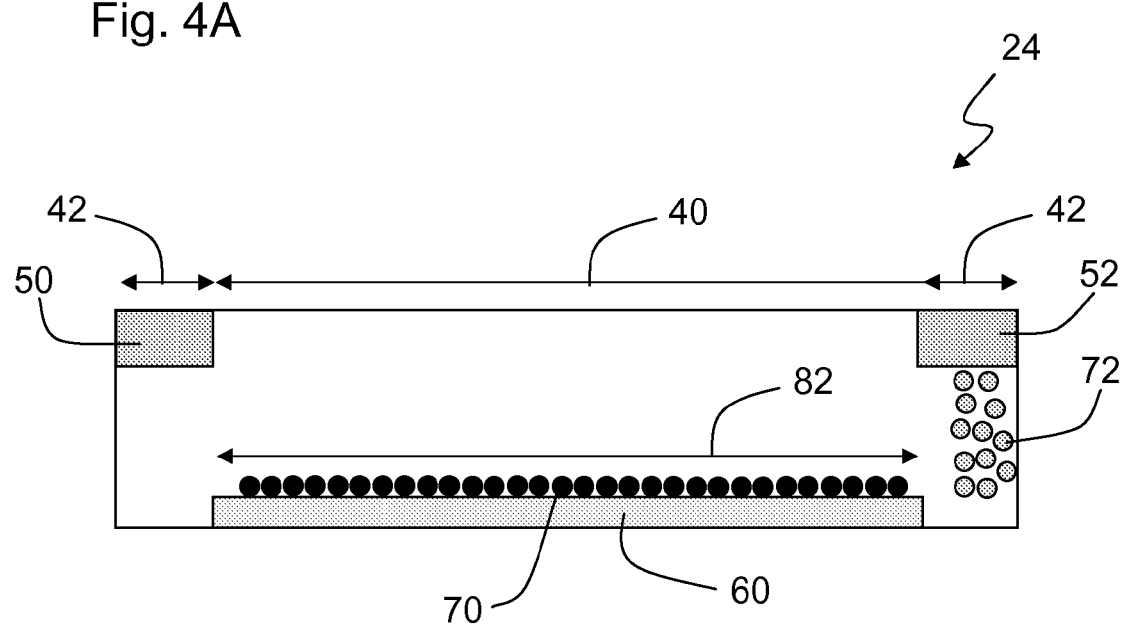

FIGS. 4A and 4B show a schematic cross-sectional view of a third embodiment of a pixel 24 of an electrophoretic display device 10 according to the invention. In this third embodiment of the pixel 24, the accumulation electrode 50, 52 is arranged to block the charged pigment particles 70 hidden from view. As such, the light blocking element 42 defining the storage area 42 in FIGS. 1A and 1B may be omitted, further reducing the complexity of the pixel 24. The embodiment of FIGS. 4A and 4B show a further difference in that the pixel 24 comprises a first type of charged pigment particles 70 and a second type of charged pigment particles 72, and in that the pixel 24 comprises a first accumulation electrode 50 and an oppositely charged second accumulation electrode 52. Suppose the first accumulation electrode 50 is negatively charged and the second accumulation electrode 52 is positively charged. To migrate the second type of charged pigment particles 72 from the second accumulation electrode 52 to the field electrode 60 as shown in FIG. 4A, the field electrode 60 requires a higher positive charge compared to the second accumulation electrode 52. To migrate the first type of charged pigment particles 70 from the first accumulation electrode 50 to the field electrode 60 as shown in FIG. 4B, the field electrode 60 requires a lower negative charge compared to the first accumulation electrode 50. As soon as the lower negative charge is applied to the first accumulation electrode 50 to migrate the first type of pigment particles 70 from the first accumulation electrode 50 to the field electrode 60, the second type of charged pigment particles 72 migrate from the field electrode 60 to the second accumulation electrode 52. As such, a single pixel 24 may be used to use different types of charged pigment particles 70, 72 to determine the pigmentation of the pixel 24.

In the embodiment shown in FIGS. 4A and 4B, the accumulation electrode 50, 52 and the field electrode 60 are not arranged in the in-plane configuration because no imaginary plane parallel to the field electrode 60 coincides with both the accumulation electrode 50, 52 and the field electrode 60. Still, the use of two different types of charged pigment particles 70, 72 is also possible when the accumulation electrode 50, 52 and the field electrode 60 are in the in-plane configuration, for example, when the accumulation electrode 50, 52 and the field electrode 60 are arranged on the same substrate.

Figure 5:
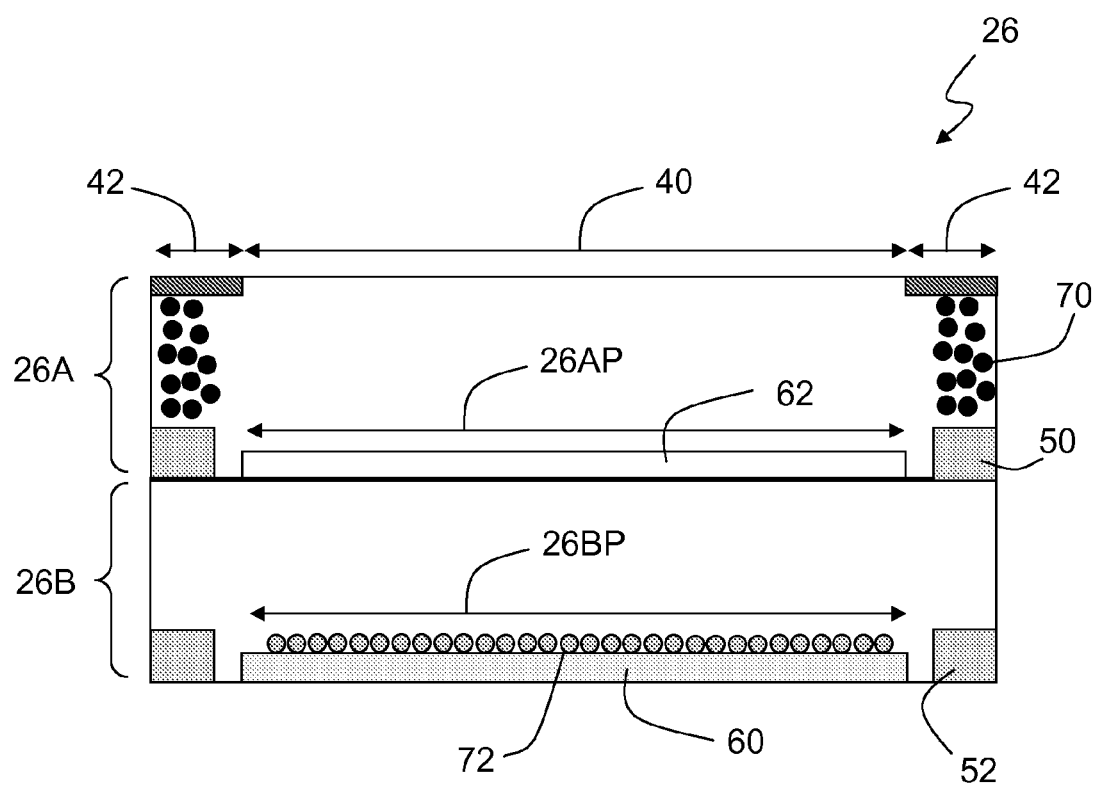
FIG. 5 shows a schematic cross-sectional view of a fourth embodiment of a pixel of an electrophoretic display device according to the invention.

FIG. 5 shows a schematic cross-sectional view of a fourth embodiment of a pixel 26 of an electrophoretic display device 10 according to the invention. In this fourth embodiment, the pixel 26 is constituted of two sub-pixels 26A, 26B, a first sub-pixel 26A and a second sub-pixel 26B stacked on top of the first sub-pixel 26A. As indicated before, such a stack of sub-pixels 26A, 26B allows using different types of charged pigment particles 70, 72 in the different sub-pixels 26A, 26B to enable different pigmentation of the pixel 26. In the embodiment shown in FIG. 5 the first sub-pixel 26A comprises a first field electrode 62 which is at least partially transparent to visible light. The second sub-pixel 26B may, for example, comprise a second field electrode 60 which may, for example, be at least partially reflective to visible light. As such, ambient light which enters the pixel 26 via the aperture 40 may be at least partially transmitted by the first sub-pixel 26A and may progress through the second sub-pixel 26B where the transmitted light may, for example, be reflected from the second field electrode 60 back towards the aperture 40 to be re-emitted by the pixel 26. As such, ambient light may be used to make the pigmentation of the pixel 26 visible to a viewer. The light progressing through both the first sub-pixel 26A and the second sub-pixel 26B may be influenced by a concentration of the first type of charged pigment particles 70 homogeneously distributed across the first field electrode 62, and may be influenced by a concentration of the second type of charged pigment particles 72 homogeneously distributed across the second field electrode 60. In such a configuration, the ambient light is typically influence twice by each of the first type of charged pigment particles 70 and the second type of charged pigment particles 72 before the ambient light is re-emitted via the aperture 40.

In the embodiment of the pixel of an electrophoretic display as shown in FIG. 5, the second field electrode 60 is reflective. A benefit when using a reflective field electrode 60 is that parallax is reduced. Electrophoretic displays often use ambient light which enters via the aperture area, is altered via the charged pigment particles 70, 72 and is subsequently re-emitted after reflection. Often, in the known electrophoretic display devices, an additional reflective layer is applied to the back of the substrate on which the electrodes are arranged to ensure the reflection of the ambient light. The thickness of the substrate represents an additional distance between the field electrode and the reflective layer which may cause parallax distortions in the image produced on the known electrophoretic display devices. By having the second field electrode 60 a reflective electrode to reflect the ambient light to be re-emitted from the pixel, no distance is present between the field electrode and the reflective layer and as such the parallax distortion is significantly reduced.

Figure 6:
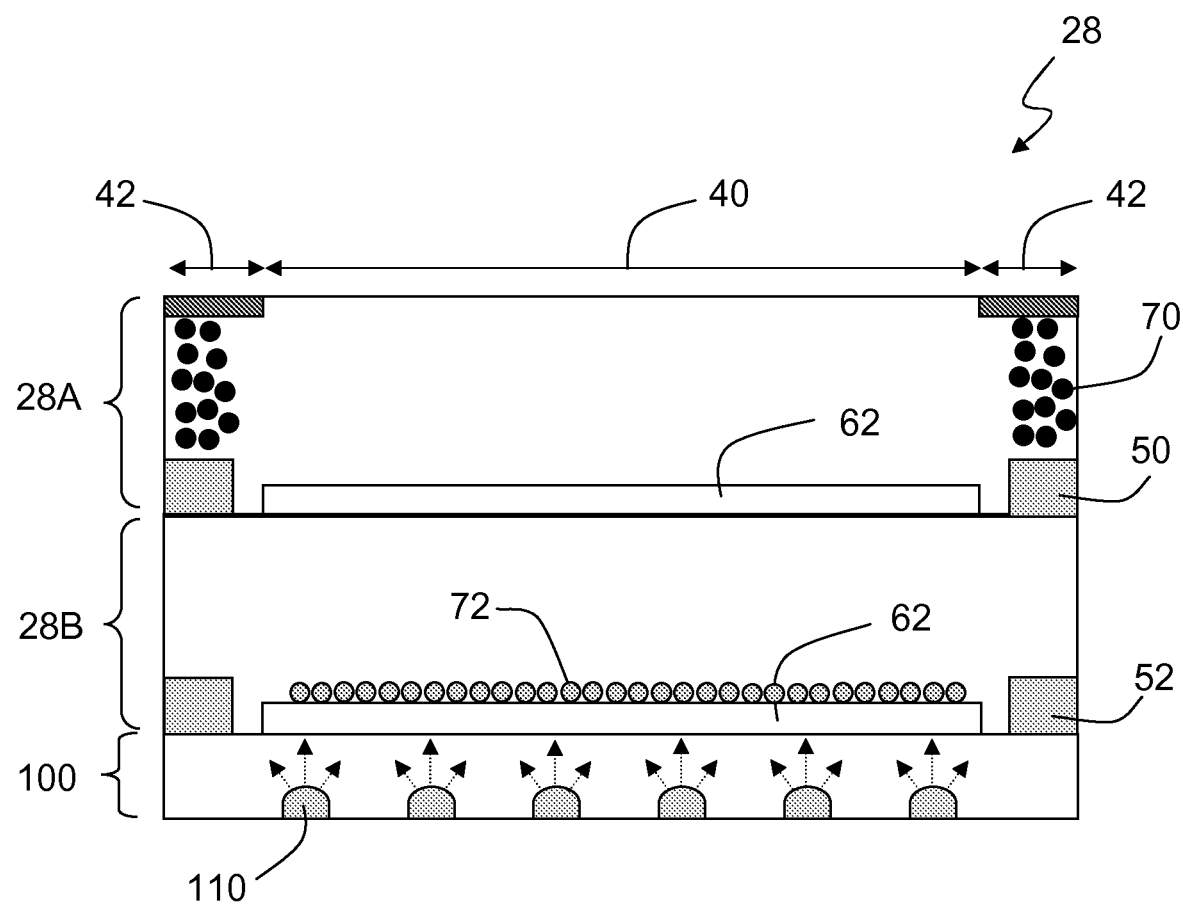
FIG. 6 shows a schematic cross-sectional view of a fifth embodiment of a pixel of an electrophoretic display device comprising a backlight according to the invention.

FIG. 6 shows a schematic cross-sectional view of a fifth embodiment of a pixel 28 of an electrophoretic display device 10 comprising a backlight 100 according to the invention. This fifth embodiment of pixel 28 is similar to the fourth embodiment of pixel 26. However, now also the second subpixel 28B has a second field electrode 62 which is at least partially transparent to visible light. Furthermore, the pixel 28 comprises a backlight 100 for illuminating the pixel 28 from the back. The color and/or intensity of the light transmitted through the pixel 28 depends on the concentration of the first type of charged pigment particles 70 and/or on the concentration of the second type of charged pigment particles 72. In the embodiment shown in FIG. 6, the pixel 28 comprises a plurality of light sources 110. However, typically, a plurality of pixels 28 shares a single light source 110.

Figure 7:
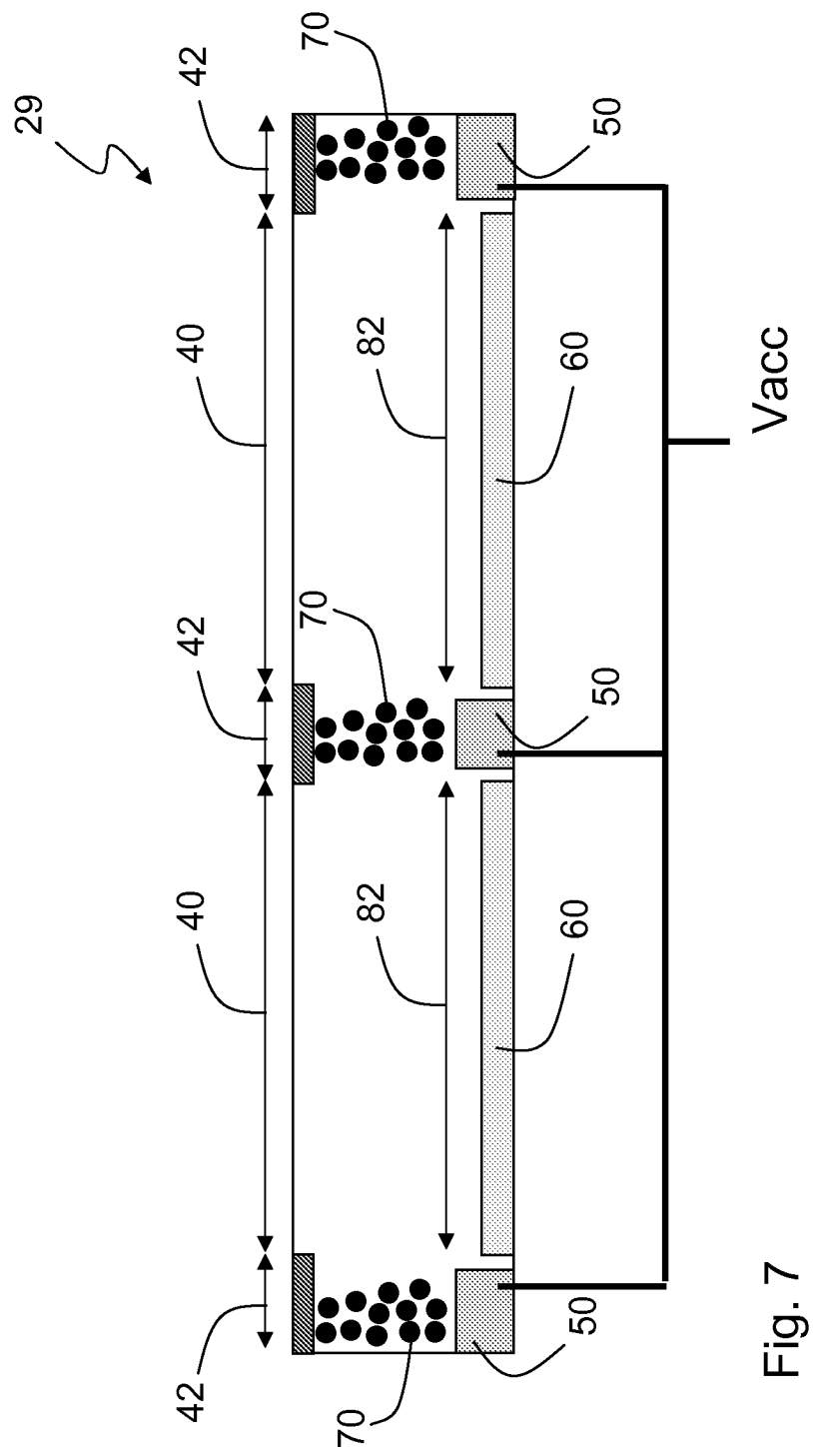
FIG. 7 shows a schematic cross-sectional view of a plurality of pixels of an electrophoretic display device comprising a common accumulation electrode.

FIG. 7 shows a schematic cross-sectional view of a plurality of pixels 22 of an electrophoretic display device 10 comprising a common accumulation electrode 50 at a voltage Vacc. The common accumulation electrode 50 omits a need for a barrier between the plurality of pixels 22. Due to the dimensions of the charged pigment particles 70 which are selected sufficiently small, the charged pigment particles 70 are captured by the electrical field present and do not wander around through the pixels 22. Furthermore, due to the nature of the selected charged pigment particles 70, the charged pigment particles 70 always generate a homogeneous distribution at a charged electrode. This charged electrode may be the field electrode 60 or the accumulation electrode 50. When coupling the accumulation electrodes 50 of a plurality of pixels 22 to form a common accumulation electrode 50, all charged pigment particles 70 which are present on the common accumulation electrode 50 form a substantial homogeneous distribution across the common accumulation electrode 50, thus ensuring that there are always sufficient charged pigment particles 70 near the field electrode 60 of any of the plurality of pixels 22 to provide sufficient contrast. As such, no additional barriers or structures are required.

FIGS. 8A to 8D show different configurations of the accumulation electrode 50, 52 and the field electrode 60, 62 of a pixel 22.

Figure 8A:
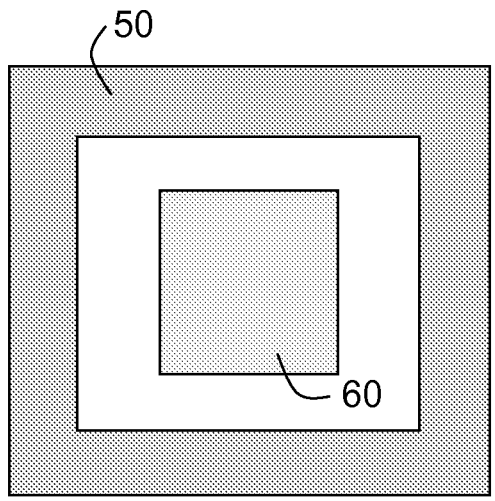
FIGS. 8A to 8D show different configurations of the accumulation electrode and the field electrode of a pixel.

In FIG. 8A the accumulation electrode 50 fully surrounds the field electrode 60. As such, the distance which the charged pigment particles 70 have to travel to migrate from one to the other is minimized. Such a configuration would reduce the switching speed which is defined as the time required for sufficient charged pigments particles 70 to switch from the field electrode 60 to the accumulation electrode 50 and vice versa.

Figure 8B:
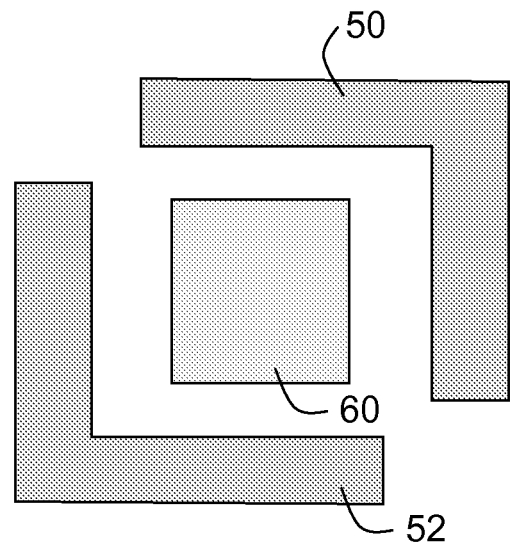

In FIG. 8B two different accumulation electrodes 50, 52 are present, for example, accumulating different charged pigment particles 70, 72, similar to the embodiment shown in FIGS. 4A and 4B. Again, the accumulation electrodes 50, 52 surround the field electrode 60 as much as possible to ensure a fast switching of the charged pigment particles 70, 72.

Figure 8C:
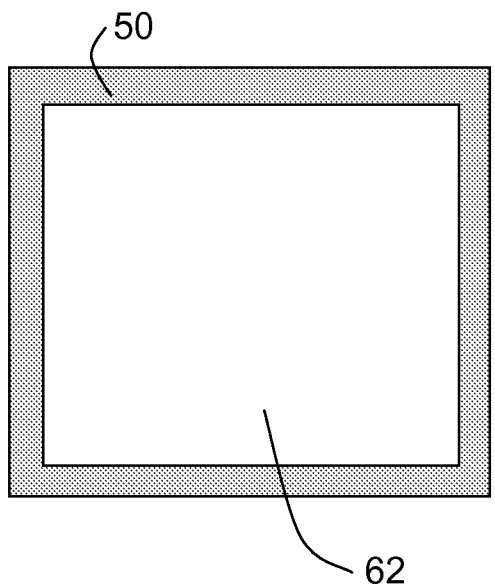

In FIG. 8C the field electrode 62 is at least partially transparent to visible light. Although not indicated in FIG. 8C, there is a gap between the field electrode 62 and the accumulation electrode 50 surrounding the field electrode 62. This gap may, for example in a direction perpendicular to the surface of the field electrode 62. In the current embodiment the field electrode 62 substantially covers the whole aperture area 40 of the pixel 22. The concentration of charged pigment particles 70 distributed across the field electrode 62 defines a perceived color or intensity of the light transmitted through the pixel 22. In the arrangement of FIG. 8C a backlighting system 100 may be present to illuminate the pixel 22 from the rear. The transmission through the field electrode 62, which comprises a specific concentration of uniformly distributed charged pigment particles 70, determines the perceived color or intensity.

Figure 8D:
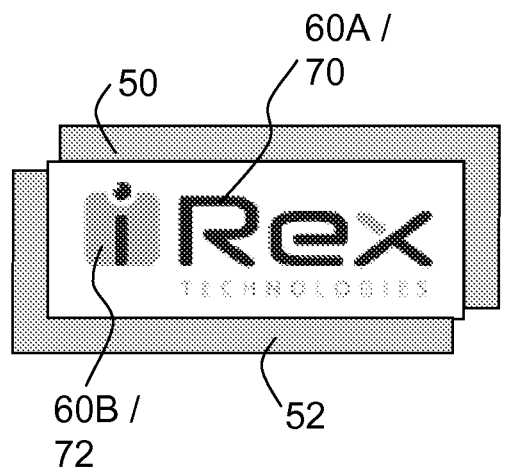

In FIG. 8D a pixel 22 comprising different field electrodes 60A, 60B and different common electrodes 50, 52 to generate a predefined structure. For example, the first field electrode 60A is configured to comprise a first type of charged pigment particles 70 and the second field electrode 60B is configured to comprise a second type of charged pigment particles 72. Each of the first type of charged pigment particles 70 and the second type of charged pigment particles 72 may be accumulated via the different accumulation electrodes 50, 52, respectively. Using such a configuration, even full company logos may be generated, for example, at switch-on of the device. The logo may, for example, be generated using two different colors, for example, the first type of charged pigment particles 70 being black and the second type of charged pigment particles 72 being green.

FIGS. 9A to 9D show different signals provided to the field electrode to adapt the pigmentation of the pixel.

Figure 9A:
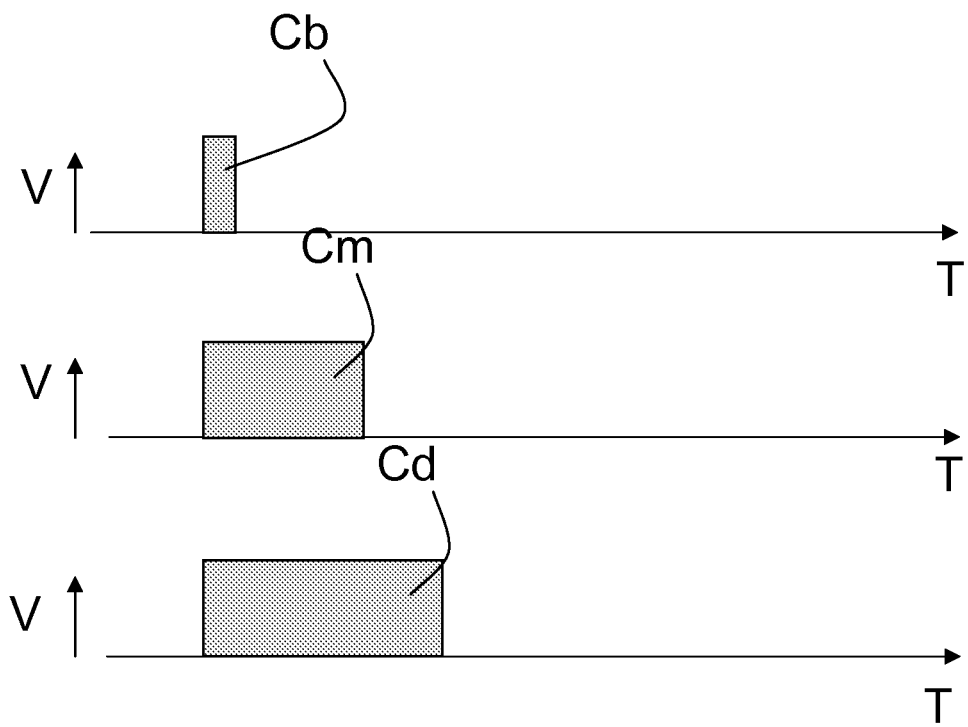
FIGS. 9A to 9D show different signals provided to the field electrode to adapt the pigmentation of the pixel.

In FIG. 9A different clearing signals Cb, Cm, Cd are shown. Such clearing signal Cb, Cm, Cd is required to return to a "white" pixel from an existing predefined state. A "white" pixel represents a pixel 22 having substantially no charged pigment particles 70 on the field electrode 60. The first clearing signal Cb indicates the clearing pulse to return to a "white" pixel when the pixel 22 already was relatively bright, thus already comprises relatively few charged pigment particles 70. The second clearing signal Cm indicates the clearing pulse to return to a "white" pixel when the pixel 22 already had a mid-grey appearance due to the charged pigment particles 70 present at the field electrode 60. The third clearing signal Cd indicates the clearing pulse to return to a "white" pixel when the pixel 22 already had a dark appearance, thus having relatively many charged pigment particles 70 present at the field electrode 60.

Figure 9B:
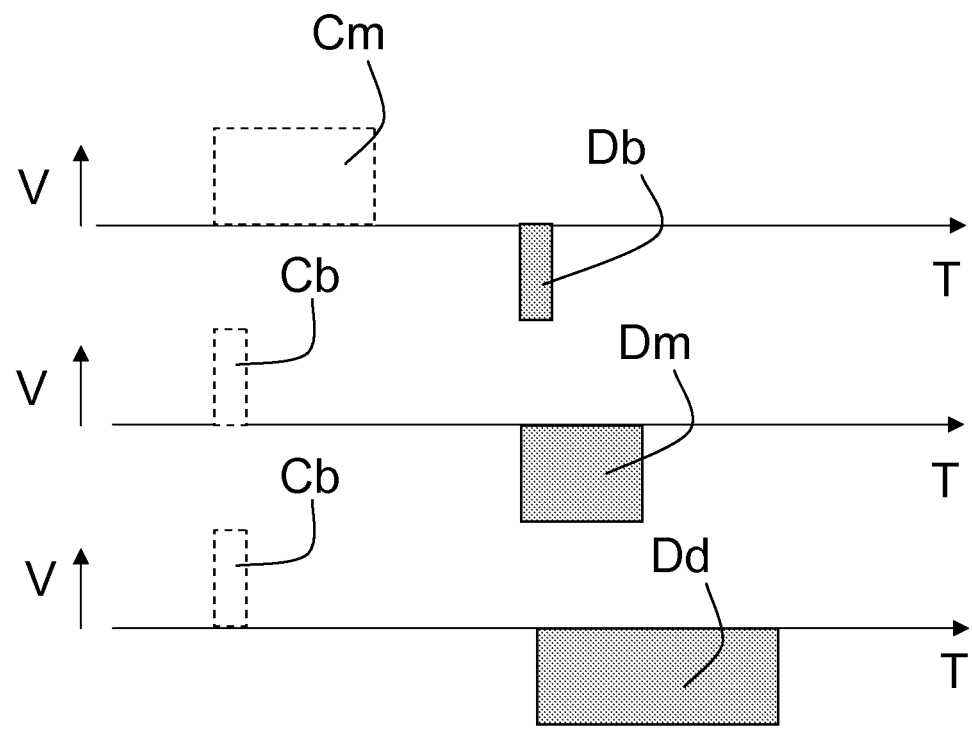

In FIG. 9B different drive-signals Db, Dm, Dd are shown from a "white" pixel towards a specific required appearance. Typically, before applying the drive signal Db, Dm, Dd, a clearing signal Cb, Cm, Cd as shown in FIG. 9A is required. In FIG. 9B some clearing signals Cm, Cb are indicated via a dashed-line to indicate the presence of the clearing signal Cb, Cm, Cd prior to the drive signal Db, Dm, Dd. Still, which of the clearing signals Cb, Cm, Cd is required depends on the appearance of the pixel before the clearing signal Cb, Cm, Cd is applied. These clearing signals Cb, Cm, Cd ensure that the electrophoretic display device remains electrically neutral. The first drive-signal Db is a very narrow pulse Db—as such, the pixel 22 remains relatively bright as only a few charged pigment particles 70 transfer from the accumulation electrode 50 to the field electrode 60. The second drive-signal Dm is broader and as a result, the pixel 22 will obtain more charged pigment particles 70 and represent a mid-gray color and/or intensity. The third drive-signal Dd is broader again, and as such represents a dark appearance of the pixel 22 having a dark color and/or intensity.

Figure 9C:
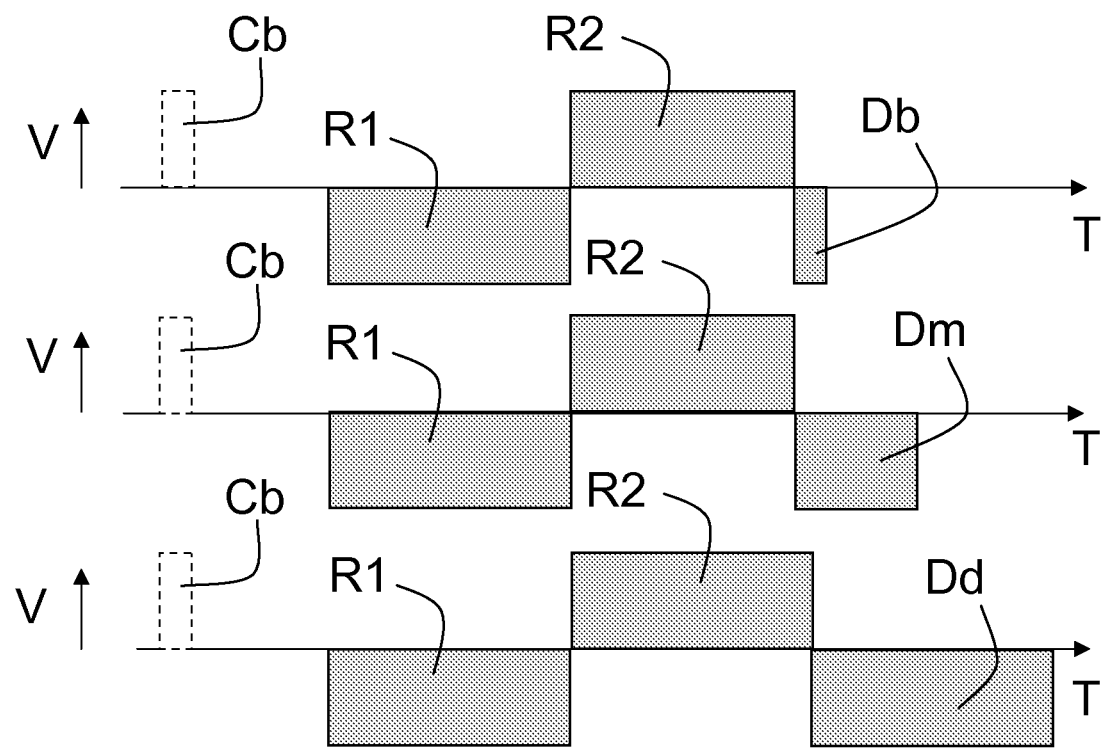
Figure 9D:
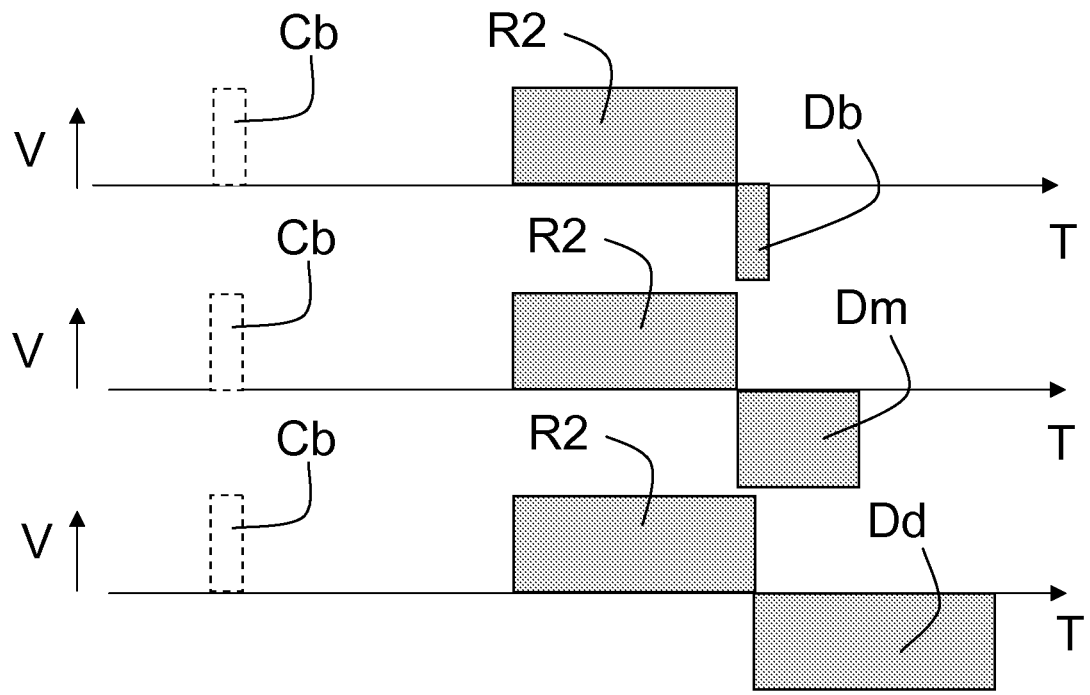

FIGS. 9C and 9D show again the drive-signals Db, Dm, Dd, however now having reset pulses R1, R2 prior to the generation of the required drive-signals Db, Dm, Dd. Again, before applying the drive signal Db, Dm, Dd, or the reset pulses R1, R2, a clearing signal Cb, Cm, Cd as shown in FIG. 9A is required, which again is indicated with a dashed-line. In FIG. 9C two subsequent reset pulses R1, R2 are generated to ensure that the required perceived appearance is always correct and not depending on the initial state. In FIG. 9D only a single reset pulse R1 is used which is, for example, ensure that all charged pigment particles 70 are sent to the accumulation electrode 50 before applying the drive pulses to generate the required perceived appearance of the pixel 22.

Although the drive signals Db, Dm, Dd, the reset pulses R1, R2 and the clearing signals Cb, Cm, Cd are shown in FIGS. 9A to 9D in single substantially square pulses having different pulse-length, the skilled person may easily understand that the same functionality may be obtained by pulses which deviate slightly from the square shape. Furthermore, the pulse length is achieved in the shown examples by using a single substantially square pulse having the specific pulse-length. However, it will be apparent to the skilled person that a train of smaller pulses may be applied which together have substantially the same signal length as the single square pulse to obtain a same effect as the single square pulse. A benefit of applying a train of smaller pulses is that the pulse length does not need to be altered for each signal but the number of short pulses need to be adapted to determine the pigmentation of the pixel 22 by the charged pigment particles 70.

It should be noted that items which have the same reference numbers in different Figures, have the same structural features and the same functions, or are the same signals. Where the function and/or structure of such an item has been explained, there is no necessity for repeated explanation thereof in the detailed description.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An electrophoretic display device comprising a pixel comprising charged pigment particles for determining a pigmentation of the pixel,
the pixel comprising an aperture area being a visible part of the pixel determining the pigmentation of the pixel, the pixel further comprising a storage area for storing the charged pigment particles away from the aperture area,
the pixel comprising an accumulation electrode and a field electrode, the accumulation electrode being arranged at the storage area for accumulating the charged pigment particles away from the aperture area, and the field electrode occupying a field-electrode area being at least a part of the aperture area of the pixel, the charged pigment particles being movable between the accumulation electrode and the field electrode under control of an electric field, a dimension of the charged pigment particles being selected sufficiently small to obtain a uniform distribution of charged pigment particles across the field-electrode area for generating a substantial homogeneous pigmentation at the part of the aperture of the pixel occupied by the field electrode, the sufficiently small charged pigment particles having a repellent force to prevent the forming of a rim of charged pigment particles at or around the field-electrode edges, the charged pigment particles comprise nano-particles having a particle size below 400 nanometers, wherein
the accumulation electrode and the field electrode are arranged in a configuration wherein the accumulation electrode is arranged at a top side of the pixel to block viewing of accumulated particles in the storage area through the aperture area of the pixel, and the field electrode is located at an opposite bottom side of the pixel to thereby define a vertical space with the accumulation electrode and provide at least partly vertical movement of the charged particles therebetween; and wherein
the electrophoretic display device comprises a plurality of pixels, each comprising the aperture area comprising the field electrode, and each comprising the storage area comprising the accumulation electrode, the accumulation electrodes of the plurality of pixels being coupled to form a common accumulation electrode for the plurality of pixels, the common accumulation electrode omitting a need for a barrier between the plurality of pixels; and wherein
a part of the common accumulation electrode that is arranged adjacent to the field electrodes of adjacent pixels is shared between said adjacent pixels in such a manner that said part of the common accumulation electrode is configured to accumulate charged pigment particles corresponding to both adjacent pixels.

2. The electrophoretic display device as claimed in claim 1, wherein the electrophoretic display device comprises a driver circuit for driving the pixel and for determining a pigmentation of the pixel, the driver circuit being configured for temporarily varying a static charge difference between the field electrode and the accumulation electrode for determining an amount of charged pigment particles to move from the accumulation electrode to the field electrode and/or from the field electrode to the accumulation electrode.

3. The electrophoretic display device as claimed in claim 1, wherein the field-electrode area is larger than half the aperture area.

4. The electrophoretic display device as claimed in claim 1, wherein the field-electrode area is substantially equal to the aperture area.

5. The electrophoretic display device as claimed in claim 1, wherein the field electrode is at least partially transparent to visible light.

6. The electrophoretic display device as claimed in claim 1, wherein the field electrode is at least partially reflective to visible light.

7. The electrophoretic display device as claimed in claim 1, wherein the accumulation electrode of the pixel comprises a first accumulation electrode and a second accumulation electrode, and wherein the charged pigment particles comprise a first type of charged pigment particles and a second type of charged pigment particles, the first type of charged pigment particles being oppositely charged with respect to the second type of charged pigment particles, and, in operation, the first accumulation electrode being oppositely charged with respect to the second accumulation electrode.

8. The electrophoretic display device as claimed in claim 7, wherein the first and second accumulation electrodes are arranged at opposite side edges of the top side of the pixel, the first and second accumulation electrodes being spaced laterally and vertically relative to the field electrode and defining therebetween the aperture area of the pixel.

9. The electrophoretic display device as claimed in claim 8, wherein the first and second accumulation electrodes define first and second storage areas for the first and second types of charged particles to thereby block viewing of the first and second types of charged pigment particles when in the first and second storage areas, respectively.

10. The electrophoretic display device as claimed in claim 1, wherein the pixel comprises a first sub-pixel and a second sub-pixel adjacent to the first sub-pixel and stacked in a direction substantially perpendicular to the aperture area.

11. The electrophoretic display device as claimed in claim 1, wherein the electrophoretic display device comprises a backlighting system for illuminating the pixel, the charged pigment particles in the pixel being configured for altering a transmission of light emitted by the backlighting system through the pixel.

12. A driver circuit for use in an electrophoretic display device according to claim 1, the driver circuit being configured for applying a time-varying electric field between the accumulation electrode and the field electrode of the electrophoretic display device for determining an amount of charged pigment particles being moved between the accumulation electrode and the field electrode.

13. Chargeable or charged pigment particles for use in an electrophoretic display device according to claim 1, wherein the chargeable or charged pigment particles, when charged and in use in the electrophoretic display device, are selected sufficiently small to obtain a uniform distribution of charged pigment particles across the field-electrode area, the sufficiently small charged pigment particles having a repellent force to prevent the forming of a rim of charged pigment particles at or around the field-electrode edges, the charged pigment particles comprising nano-particles having a particle size below 400 nanometers.

* * * * *